United States Patent

Udagawa

Patent Number: 5,211,408
Date of Patent: May 18, 1993

[54] METAL LAMINATE GASKET WITH A SEALING GROOVE

[75] Inventor: Tsunekazu Udagawa, Ichikawa, Japan

[73] Assignee: Ishikawa Gasket Co., Ltd., Tokyo, Japan

[21] Appl. No.: 837,312

[22] Filed: Feb. 19, 1992

[51] Int. Cl.⁵ .............................................. F16J 15/08
[52] U.S. Cl. ................................ 277/235 B; 277/234; 277/236
[58] Field of Search .................... 277/235 B, 234, 233, 277/236

[56] References Cited

U.S. PATENT DOCUMENTS

| | | | |
|---|---|---|---|
| 4,759,585 | 7/1988 | Udagawa | 277/236 X |
| 4,867,462 | 9/1989 | Udagawa | 277/235 B |
| 4,971,338 | 11/1990 | Udagawa | 277/235 B |

FOREIGN PATENT DOCUMENTS

| | | | |
|---|---|---|---|
| 0121259 | 7/1984 | Japan | 277/235 B |
| 0255252 | 11/1986 | Japan | 277/235 B |
| 0181756 | 11/1987 | Japan | 277/235 B |
| 0293363 | 11/1988 | Japan | 277/235 B |
| 0931710 | 7/1963 | United Kingdom | 277/235 B |

*Primary Examiner*—William A. Cuchlinski, Jr.
*Assistant Examiner*—J. Folker
*Attorney, Agent, or Firm*—Kanesaka and Takeuchi

[57] ABSTRACT

A metal laminate gasket of the invention seals between two engine parts with holes. The gasket is basically formed of a first plate and a second plate situated above the first plate. The first plate includes a groove formed around a hole to be sealed, which includes an inlet portion and two inclined side walls. The second plate includes a bead formed around the hole to be sealed, which includes two base portions and two side portions. When the first and second plates are assembled, the side portions of the bead abut against the side walls of the groove. When the gasket is tightened, the side portions of the bead are pushed against the side walls of the groove to seal therebetween, and surface pressures are formed at the base portions of the bead around the groove to securely seal between the engine parts.

11 Claims, 1 Drawing Sheet

METAL LAMINATE GASKET WITH A SEALING GROOVE

BACKGROUND OF THE INVENTION AND RELATED ART STATEMENT

The present invention relates to a metal laminate gasket for sealing around a hole by means of a bead and a sealing groove for receiving the bead therein.

In a metal gasket, it is common to form a bead on a metal plate around a hole to be sealed. The bead projects outwardly from the metal plate and includes a top portion and two base portions at the bottom of the bead. When the bead with the top portion and the base portions is tightened between two engine parts, the bead is compressed by the engine parts, so that the bead is flattened and generally forms a plurality of corrugated beads to tightly seal around the hole.

In the corrugated beads, strong sealing forces are formed at portions corresponding to the top portion and two base portions. Generally, the sealing force at the top portion acts in the direction that the bead projects, and the sealing forces at the base portions act in the direction opposite to the sealing force of the top portion. Accordingly, the bead can seal widely at the base portions rather than at the top portion.

In view of the above characteristics of the bead, Japanese Utility Model Publication (KOKAI) No. 62-181756 was proposed, wherein a gasket is formed of an inner plate having two grooves and two outer plates having beads respectively. Top portions of the beads are situated in the grooves of the inner plate so that base portions orient outwardly.

In the above Japanese publication, although the base portions seal between the gasket and the engine parts, the top portions are simply located in the grooves. Since large forces are applied to the top portions when the gasket is tightened, the top portions of the two beads must face against each other through the inner plate. Otherwise, the inner plate may be bent by the force supplied to the top portions of the beads.

In view of the disadvantages of the above prior art, the present invention has been made.

Accordingly, one object of the invention is to provide a metal laminate gasket, which has wide and strong sealing areas without concentrating sealing force at one point.

Another object of the invention is to provide a metal laminate gasket as stated above, which is relatively thin while forming grooves and beads.

A further object of the invention is to provide a metal laminate gasket as stated above, wherein surface pressures can be regulated easily.

A still further object of the invention is to provide a metal laminate gasket as stated above, which can be easily and economically manufactured.

Further objects and advantages of the invention will be apparent from the following description of the invention.

SUMMARY OF THE INVENTION

A metal laminate gasket of the invention is used for sealing between two parts, i.e. contact surfaces of engine parts, with holes. The gasket is basically formed of a first plate and a second plate extending throughout an entire area of the engine parts.

The first plate is provided with a first hole corresponding to the holes of the engine parts and a first groove formed around the first hole. The first groove includes an inlet portion and two inclined side walls extending downwardly from the inlet portion to converge together.

The second plate is situated on the first plate, and includes a second hole corresponding to the first hole and a first bead formed around the second hole. The first bead includes a top portion or an apex, two base portion and two side portions between the top portion and the respective base portions.

The distance or width between the base portions is greater than the distance or width at the inlet portion of the groove. Therefore, when the first and second plates are assembled, the side portions of the first bead abut against the side walls of the first groove. When the first and second plates are tightened, the side portions of the first bead are pushed against the side walls of the first groove to seal therebetween, and surface pressures are formed at the base portions of the first bead around the first groove.

Since the side portions of the firs& bead abut against the side walls of the first groove, when the gasket is tightened, pressure applied to the first bead is supported by the side walls of the first groove. Namely, the tightening pressure applied to the bead is not concentrated at one portion.

When the gasket is tightened, the side portions of the first bead closely contact the side walls of the first groove, while the base portions of the first bead form surface pressure relative to the engine part. Therefore, the gasket can securely seal between the engine parts.

The first plate may have a second groove as in the first groove at a side opposite to the first groove, while a third plate with a second bead as in the second plate ma be laminated over the first plate so that the second bead enters the second groove. As a result, both sides of the gasket can provide surface pressures against the engine parts to seal tightly.

The first groove and the first bead may be located above the second groove and the second bead. Alternatively, the first groove and the first bead may be located radially away from the second groove and the second bead relative to the engine hole.

In case that the first groove is not formed just above the second groove, the first plate may be made thin. Namely, the depths of the first and second grooves may be made greater than the thickness of the first plate. Since the side walls of the first and second grooves support the side portions of the first and second beads, the first plate does not generally bend when the gasket is tightened.

Also, inclination angles of the side walls of the groove may be changed. In case an inclination angle of the side wall relative to the upper surface of the first plate is greater, the side portion of the bead forms greater surface pressure. Namely, the surface pressures of the bead may be changed by the inclination angles of the side walls.

The metal laminate gasket of the invention may be used in any places as used in the conventional metal gasket.

DETAILED DESCRIPTION OF THE INVENTION

Figure 1:
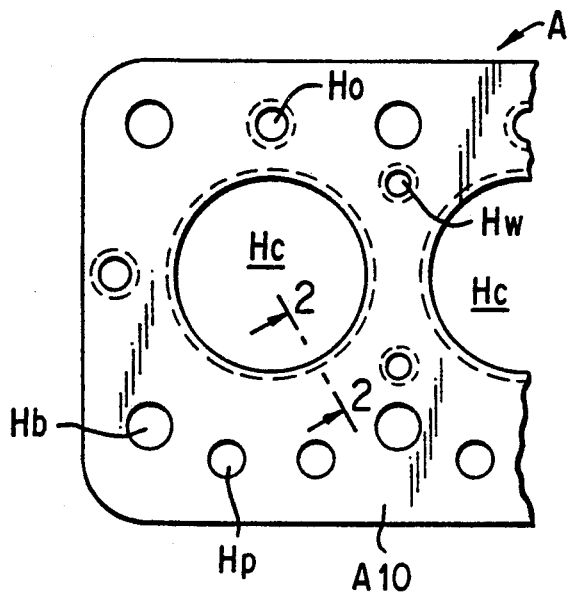
FIG. 1 is a partial plan view of a first embodiment of a metal laminate gasket of the invention.
Figure 2:
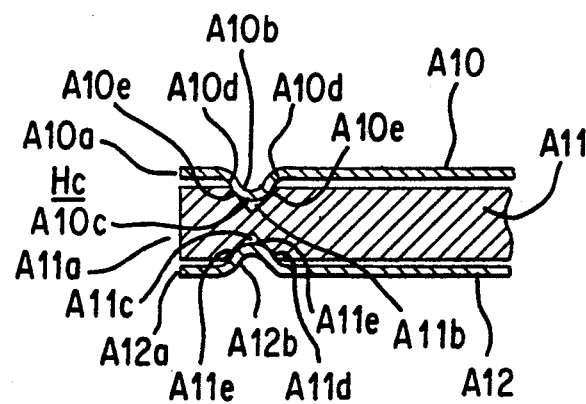
FIG. 2 is an enlarged section view taken along a line 2—2 in FIG. 1.

Referring to FIGS. 1 and 2, a first embodiment A of the metal laminate gasket of the invention is shown. The gasket A is a cylinder head gasket and includes a plurality of cylinder bores Hc, water holes Hw, oil holes Ho, push rod holes Hp and bolt holes Hb, as in the conventional gasket.

In the gasket A, the same sealing mechanisms are formed around the cylinder bores Hc, water holes Hw and oil holes Ho. However, if desired, it is possible to form different sealing mechanisms around the cylinder bores Hc and so on. The water holes Hw may only be sealed by the sealing mechanism of the present invention.

As shown in FIG. 2, the gasket A is formed of an upper plate A10, a middle plate A11, and a lower plate A12. The upper plate A10 includes a hole A10a corresponding to the cylinder bore Hc and a bead A10b projecting toward the middle plate A11. The bead A10b includes a top portion A10c, two base portions A10d, and two side portions A10e between the top portion A10c and the respective base portions A10d.

The middle plate A11 includes a hole A11a corresponding to the cylinder bore Hc, and two grooves A11b, A11c. Each groove, i.e. A11b, A11c, is provided with an inlet portion A11d and two inclined side walls A11e.

The lower plate A12 is similar to the upper plate A10 and is provided with a hole A12a corresponding to the cylinder bore Hc and a bead A12b projecting toward the middle plate A11. The bead A12b includes a top portion, two base portions and two side portions, as in the bead A10b.

The width of the bead A10b at the base portions A10d is greater than the width of the groove A11b at the inlet portion A11d. Similarly, the width of the bead A12b at the base portions is greater than the width of the groove A11c at the inlet portion.

Therefore, when the gasket A is assembled, though the beads A10b, A12b are located in the grooves A11b, A11c, the beads A10b, A12b are not completely situated inside the grooves A11b, A11c. The side portions of the beads A10b, A12b abut against the side walls of the groove A11b, A11c, and the base portions of the bead A10b, A12b are located away from the inlets of the groove A11b, A11c.

When the gasket A thus assembled is compressed, the beads A10b, A12b are pushed to fully enter into the groove A11b, A11c, respectively. As the gasket A is further compressed, the side portions of the beads A10b, A12b are bent along the inlets of the grooves A11b, A11c, and the base portions of the beads A10b, A12b are flattened. Accordingly, the beads A10b, A12b form strong surface pressure at the side portions and the base portions of the beads A10b, A12b around the inlets of the grooves A11b, A11c.

Since the beads A10b, A12b are strongly pushed into the grooves A11b, A11c, the plates A10, A11, A12 are completely sealed with each other. Also, the side portions and the base portions of the beads A10b, A12b are deformed by compressing force, which form strong surface pressure against engine parts (not shown). Accordingly, the gasket. A can widely and completely seal between the two engine parts.

In the gasket A, since the beads A10b, A12b are situated in the grooves A11b, A11c, the beads can be precisely positioned.

In the gasket A, the plates A10, A12 are made of steel plates, but the plate A11 may be made of a steel plate or a mild metal plate. The thickness of the plates are selected as desired. Preferably, in case the plates A10, A12 have thickness of 0.15–0.3 mm, the plate A11 has thickness of 0.4–0.8 mm.

Figure 3:
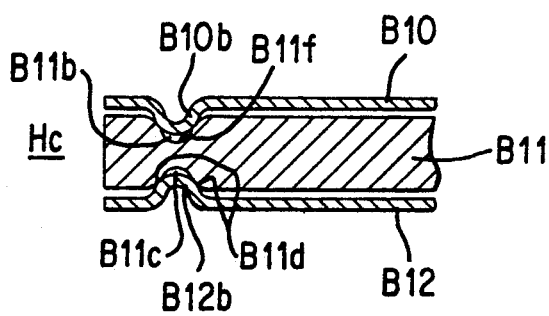
FIGS. 3 and 4 are section views, similar to FIG. 2, for showing second and third embodiments of the invention.

FIG. 3 shows a second embodiment B of the metal laminate gasket of the invention. The gasket B is formed of an upper plate B10 with a bead B10b, a middle plate B11 with grooves B11b, B11c, and a lower plate B12 with a bead B12b, similar to the gasket A.

In the gasket A, the edges of the grooves A11b, A11c are formed sharply. However, in the gasket B, edges of the grooves B11b, B11c, especially bottoms B11f and inlet portions B11d, are curved smoothly.

Accordingly, when the gasket B is tightened, the beads B10b, B12b substantially completely enter into the grooves B11b, B11c to seal between the plates, Also, when the beads B10b, B12b are bent along the inlet portions, forces applied to the inlet portions are spread widely, and fatigue of the beads at the inlet portions can be effectively reduced.

Figure 4:
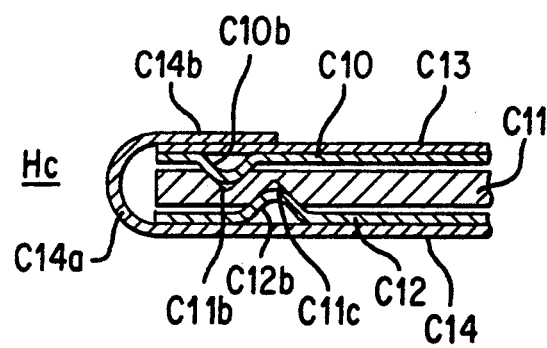

FIG. 4 shows a third embodiment C of the metal laminate gasket of the invention. The gasket C includes a plate C10 with a bead C10b, a plate C11 with grooves C11b, C11c, and a plate C12 with a bead C12b, similar to the gasket A. However, in the gasket C, a plate C13 is situated above the plate C10, and a plate C14 is situated under the plate C12. The plate C14 is curved at a curved portion C14a and is situated above the plate C13 at a flange C14b.

Further, in the gasket C, the groove C11c is not located under the groove C11b, and is situated further away from the cylinder bore Hc. The beads C10b, C12b are arranged to be located in the respective grooves C11b, C11c.

In the gasket C, since the groove C11c is arranged laterally away from the groove C11b, it is possible to reduce the thickness of the plate C11. Namely, in case the grooves are vertically arranged, the plate C11 must have thickness greater than the total depths of the grooves. However, in case the grooves are arranged laterally away from each other, the thickness of the plate C11 may be thinner than the total depths of the grooves.

In the gasket C, therefore, the thickness of the plates C10, C11, C12 is totally reduced. Also, since the beads C10b, C12b affect the back sides of the respective beads, the sealing areas become wide as a whole.

Figure 5:
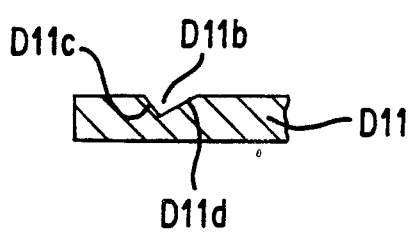
FIG. 5 is a section view of a metal plate constituting a fourth embodiment of the invention.

FIG. 5 shows a plate D11 for constituting a metal laminate gasket D together with a plate D10 with a bead D10b (not shown) similar to the plate A10. The plate D11 includes a groove D11b having a steep side wall D11c and a moderate side wall D11d.

When the bead D10b is situated in the groove D11b, and the gasket D is tightened, the bead D10b deforms along the shape of the groove D11b. Namely, a part of the bead adjacent the steep side wall D11c forms a strong surface pressure, while a part of the bead adjacent the moderate side wall D11d forms a moderate surface pressure because of the inclination angles of the bead.

In the gasket D, it is possible to change the surface pressures in one bead by changing the inclination angles of the side walls. Accordingly, the surface pressures in one bead can be easily controlled.

In the present invention, side portions of a bead formed in one plate are supported by inclined side walls formed on another plate to widely support the bead, and surface pressures of the bead are widely formed around an inlet portion of the groove. Therefore, the gasket of the invention can securely seal between the engine parts.

While the invention has been explained with reference to the specific embodiments of the invention, the explanation is illustrative and the invention is limited only by the appended claims.

What is claimed is:

1. A metal laminate gasket for sealing between contact surfaces of two engine parts with holes, comprising:

a first plate extending substantially throughout an entire area of the engine parts, said first plate having a first hole corresponding to the holes of the engine parts and a first groove formed around the first hole, said first groove having an inlet portion and two inclined side walls extending downwardly from the inlet portion to converge together, and a second plate situated on the first plate, said second plate having a second hole corresponding to the first hole and a first bead formed around the second hole, said first bead having an apex, two base portions and two side portions, each side portion being situated between the base portion and the apex, a distance between the base portions being greater than a distance at the inlet portion of the groove so that when the first and second plates are assembled, the side portions of the first bead are located above the side walls of the first groove and spaces are formed between the apex and a bottom of the groove and between the first and second plates other than the bead and the groove, and when the first and second plates are tightened, the first and second plates substantially closely contact with each other, the side portions of the first bead are pushed against the side walls of the first groove to seal therebetween and surface pressures are formed at the base portions of the first bead around the first groove to thereby securely seal around the holes of the engine parts.

2. A metal laminate gasket according to claim 1, wherein said first groove has curved edges at corners thereof so that the bead can be compressed smoothly thereat.

3. A metal laminate gasket for sealing between contact surfaces of two engine parts with holes, comprising, a first plate extending substantially throughout an entire area of the engine parts, said first plate having a first hole corresponding to the holes of the engine parts, a first groove formed around the first hole at one side of the first plate, and a second groove formed around the first hole at a side opposite to the first groove, each of said first and second grooves having an inlet portion and two inclined side walls extending inwardly from the inlet portion, a second plate situated above the first plate, said second plate having a second hole corresponding to the first hole and a first bead formed around the second hole, said first bead extending toward the first plate and having an apex, two base portions and two side portions, each side portion being situated between the base portion and the apex, and a third plate situated under the first plate, said third plate having a third hole corresponding to the first hole and a second bead formed around the third hole, said second bead extending toward the first plate and having an apex, two base portions and two side portions, each side portion being situated between the base portion and the apex of the second bead, said side portions of the first and second beads abutting against the side walls of the respective first and second grooves when the first, second and third plates are assembled, and said side portions of the first and second beads being pushed against the side walls of the respective first and second grooves to seal therebetween and surface pressures being formed at the base portions of the respective first and second beads around the first and second grooves to thereby securely seal around the holes of the engine parts when the first, second and third plates are tightened, distances from the hole of the engine to the first groove and the first bead being different from distances from the hole of the engine to the second groove and the second bead so that the first and second beads are arranged concentrically relative to the hole of the engine at a predetermined distance away from each other.

4. A metal laminate gasket according to claim 3, wherein said first and second grooves are formed not to overlap with each other.

5. A metal laminate gasket according to claim 4, wherein said first and second grooves have depths, total depths of the first and second grooves being greater than thickness of the first plate.

6. A metal laminate gasket according to claim 3, wherein said first and second beads have heights greater than depths of the first and second grooves, respectively.

7. A metal laminate gasket for sealing between contact surfaces of two engine parts with holes, comprising, a first plate extending substantially throughout an entire area of the engine parts, said first plate having a first hole corresponding to the holes of the engine parts, a first groove formed around the first hole at one side of the first plate, and a second groove formed around the first hole at a side opposite to the first groove, each of said first and second grooves having an inlet portion, two inclined side walls extending inwardly from the inlet portion, and curved edges at corners thereof, a second plate situated above the first plate, said second plate having a second hole corresponding to the first hole and a first bead formed around the second hole, said first bead extending toward the first plate and having an apex, two base portions and two side portions, each side portion being situated between the base portion and the apex, and a third plate situated under the first plate, said third plate having a third hole corresponding to the first hole and a second bead formed around the third hole, said second bead extending toward the first plate and having an apex, two base portions and two side portions, each side portion being situated between the base portion and the apex of the second bead, said side portions of the first and second beads abutting against the side walls of the respective first and second grooves when the first, second and third plates are assembled, and said side portions of the first and second beads being pushed against the side walls of the respective first and second grooves to seal therebetween the surface pressures being formed at the base portions of the respective first and second beads around the first and second grooves to thereby securely seal around the holes of the engine parts when the first, second and third plates are tightened, said first and second beads being compressed smoothly at the corners of the first and second grooves.

8. A metal laminate gasket for sealing between contact surfaces of two engine parts with holes, comprising, a first plate extending substantially throughout an entire area of the engine parts, said first plate having a first hole corresponding to the holes of the engine parts and a first groove formed around the first hole, said first groove having an inlet portion and two inclined side walls extending downwardly from the inlet portion, said inclined side walls having inclination angles different from each other, and a second plate situated on the first plate, said second plate having a second hole corresponding to the first hole and a first bead formed around the second hole, said first bead having an apex, two base portions and two side portions, each side portion being situated between the base portion and the apex so that when the first an second plates are assembled, the side portions of the first bead are located above the side walls of the first groove, and when the first and second plates are tightened, the side portions of the first bead are pushed against the side walls of the first groove to seal therebetween and surface pressures are formed at the base portions of the first bead around the first groove to thereby securely seal around the holes of the engine parts, said surface pressures formed at the two side walls being different.

9. A metal laminate gasket according to claim 8, wherein the inclined side walls of the first groove are converged together.

10. A metal laminate gasket for sealing between contact surfaces of two engine parts with holes, comprising, a first plate extending substantially throughout an entire area of the engine parts, said first plate having a first hole corresponding to the holes of the engine parts, a first groove formed around the first hole at one side of the first plate, and a second groove formed around the first hole at a side opposite to the first groove, each of said first and second grooves having an inlet portion and two inclined side walls extending inwardly from the inlet portion, a second plate situated above the first plate, said second plate having a second hole corresponding to the first hole and a first bead formed around the second hole, said first bead extending toward the first plate and having an apex, two base portions and two side portions, each side portion being situated between the base portion and the apex, a third plate situated under the first plate, said third plate having a third hole corresponding to the first hole and a second bead formed around the third hole, said second bead extending toward the first plate and having an apex, two base portions and two side portions, each side portion being situated between the base portion and the apex of the second bead, said side portions of the first and second beads abutting against the side walls of the respective first and second grooves when the first, second and third plates are assembled, and said side portions of the first and second beads being pushed against the side walls of the respective first and second grooves to seal therebetween and surface pressures being formed at the base portions of the respective first and second beads around the first and second grooves to thereby securely seal around the holes of the engine parts when the first, second and third plates are tightened, and an outer plate situated under the third plate, said outer plate including a curved portion to define the hole of the engine, and a flange extending away from the curved portion to be located above the second plate.

11. A metal laminate gasket for sealing between contact surfaces of two engine parts with holes, comprising, a first plate extending substantially throughout an entire area of the engine parts, said first plate having a first hole corresponding to the holes of the engine parts, a first groove formed around the first hole at one side of the first plate, and a second groove formed around the first hole at a side opposite to the first groove, each of said first and second grooves having an inlet portion and two inclined side walls extending inwardly from the inlet portion, a second plate situated above the first plate, said second plate having a second hole corresponding to the first hole and a first bead formed around the second hole, said first bead extending toward the first plate and having an apex, two base portions and two side portions, each side portion being situated between the base portion and the apex, a distance between the base portions of the first bead being greater than a distance at the inlet portion of the first groove, and a third plate situated under the first plate, said third plate having a third hole corresponding to the first hole and a second bead formed around the third hole, said second bead extending toward the first plate and having an apex, two base portions and two side portions, each side portion being situated between the base portion and the apex of the second bead, a distance between the base portions of the second bead being greater than a distance at the inlet portion of the second groove, said side portions of the first and second beads abutting against the side walls of the respective first and second grooves when the first, second and third plates are assembled, and said side portions of the first and second beads being pushed against the side walls of the respective first and second grooves to seal therebetween and surface pressures being formed at the base portions of the respective first and second beads around the first and second grooves to thereby securely seal around the holes of the engine parts when the first, second and third plates are tightened.

* * * * *

UNITED STATES PATENT AND TRADEMARK OFFICE
CERTIFICATE OF CORRECTION

PATENT NO. : 5,211,408

DATED : May 18, 1993

INVENTOR(S) : Tsunekazu Udagawa

It is certified that error appears in the above-identified patent and that said Letters Patent is hereby corrected as shown below:

In column 7, claim 7, line 7, change "the" to --and--.

claim 8, line 33, change "an" to --and--.

claim 10, line 51, change "parts ,said" to --parts, said--.

Signed and Sealed this

Eleventh Day of January, 1994

Attest:

BRUCE LEHMAN

*Attesting Officer*   *Commissioner of Patents and Trademarks*